(12) United States Patent
Florent et al.

(10) Patent No.: US 6,968,078 B2
(45) Date of Patent: Nov. 22, 2005

(54) IMAGE PROCESSING METHOD, SYSTEM AND EXAMINATION APPARATUS FOR EXTRACTING A THREADLIKE STRUCTURE IN A NOISY DIGITAL IMAGE

(75) Inventors: Raoul Florent, Valenton (FR); Lucil Goubet, Paris (FR)

(73) Assignee: Koninklijke Philips Electronics, N.V., Eindhoven (NL)

( * ) Notice: Subject to any disclaimer, the term of this patent is extended or adjusted under 35 U.S.C. 154(b) by 760 days.

(21) Appl. No.: 09/855,629

(22) Filed: May 15, 2001

(65) Prior Publication Data

US 2002/0054707 A1    May 9, 2002

(30) Foreign Application Priority Data

May 18, 2000    (EP) .................................. 00401367

(51) Int. Cl.$^7$ ............................................. G06K 9/00
(52) U.S. Cl. ................................................... 382/128
(58) Field of Search ................................ 382/128, 129, 382/131, 132, 190; 378/4, 21, 42, 62; 345/694; 250/559.05

(56) References Cited

U.S. PATENT DOCUMENTS

| | | | |
|---|---|---|---|
| 4,910,786 A | * | 3/1990 | Eichel .......................... 382/199 |
| 5,274,551 A | * | 12/1993 | Corby, Jr. .................... 600/433 |
| 5,289,373 A | | 2/1994 | Zarge et al. ................. 600/434 |

* cited by examiner

Primary Examiner—Andrew W. Johns
Assistant Examiner—Shervin Nakhjavan

(57) ABSTRACT

An image processing method for extracting a thread-like structure (GW) represented on the background in a digital noisy original image (IM1), comprising steps of acquisition (1) of the original image data; extraction (2) of elementary pixel strings (A1,A2,.) associated in string sets (SA,SB,SC), each of a same threadlike structure, forming a string set image (IM2); operation (4) of a First Phase (Intra-Set Phase) automatically yielding one Best String (A,B,C) per string set (INSI); and/or operation (5) of a Second Phase (Extra-Set Phase) automatically yielding one Final Best String (FBS) by linking Best Strings or elementary strings when the Second Phase is directly carried out (EXSI), for representing the threadlike structure (GW). Application: Medical Imaging; X-ray apparatus with image processing means and display means.

18 Claims, 7 Drawing Sheets

IMAGE PROCESSING METHOD, SYSTEM AND EXAMINATION APPARATUS FOR EXTRACTING A THREADLIKE STRUCTURE IN A NOISY DIGITAL IMAGE

The invention relates to an image processing method for extracting a threadlike structure represented on a background in a noisy digital image. In particular, the invention concerns an image processing method for extracting the pixels representing a guide-wire in an X-ray fluoroscopy medical image. The invention also relates to a system for carrying out the method and to an examination apparatus having means for image processing and display.

The invention is applied to the industry of medical imaging.

An image processing method for extracting a catheter guide-wire is already disclosed in a U.S. Pat. No. 5,289,373 (Zarge et alii). This document relates to a method and an apparatus for real-time tracking of a catheter guide-wire in fluoroscopy images during interventional radiological procedures. This method comprises a first step of pixel-wise extraction for determining whether or not each pixel should be labeled as a possible guide-wire point and forming an image called binary peak image; a second step of chain model construction followed by an identification of a guide-wire model as the most promising path among previously determined chains; a third step of superimposition of the guide-wire model onto the live fluoroscopic images. The first step is an iconic process that deeply exploits the outputs of several first and second order linear operators. The second step is non-iconic. It relies to morphological operations and to chain and tree oriented methods.

The present invention has for an object to provide a method which can be carried out automatically in real time, with a substantial gain of speed with respect to the method known of the state of the art, together with higher sensitivity and selectivity, thus while considering using processing means having speed of the kind which is presently used in the state of the art.

An image processing method, which solves this problem, is claimed in claim 1. A system for carrying out the method is claimed in claim 16 and an examination apparatus is further claimed in claim 12.

The invention is described hereafter in detail in reference to the diagrammatic and schematic figures, wherein.

The invention relates to an image processing method for extracting a threadlike structure represented on a background in a noisy digital image. In an example, the threadlike structure is a guide-wire represented on the background of a medical fluoroscopy arteriogram image, which is a digital image formed with a low level of X-rays. It results that this fluoroscopy digital image is noisy. In this example, the method has for an object to extract the guide-wire pixels in order to improve its visibility in the arteriogram image. In cardiology, sequences of X-ray arteriogram images are used to visualize in real time medical procedures of introducing a catheter in a vessel. Such medical procedures deeply rely on the correct visibility of the guide-wire, which is a metallic wire introduced in the vessel for guiding the catheter. Improving the visibility of the guide-wire permits of avoiding damaging the vessel while moving the catheter in the vessel. In an other example, the threadlike structure is a thin vessel in an arteriogram image.

Figure 1A:
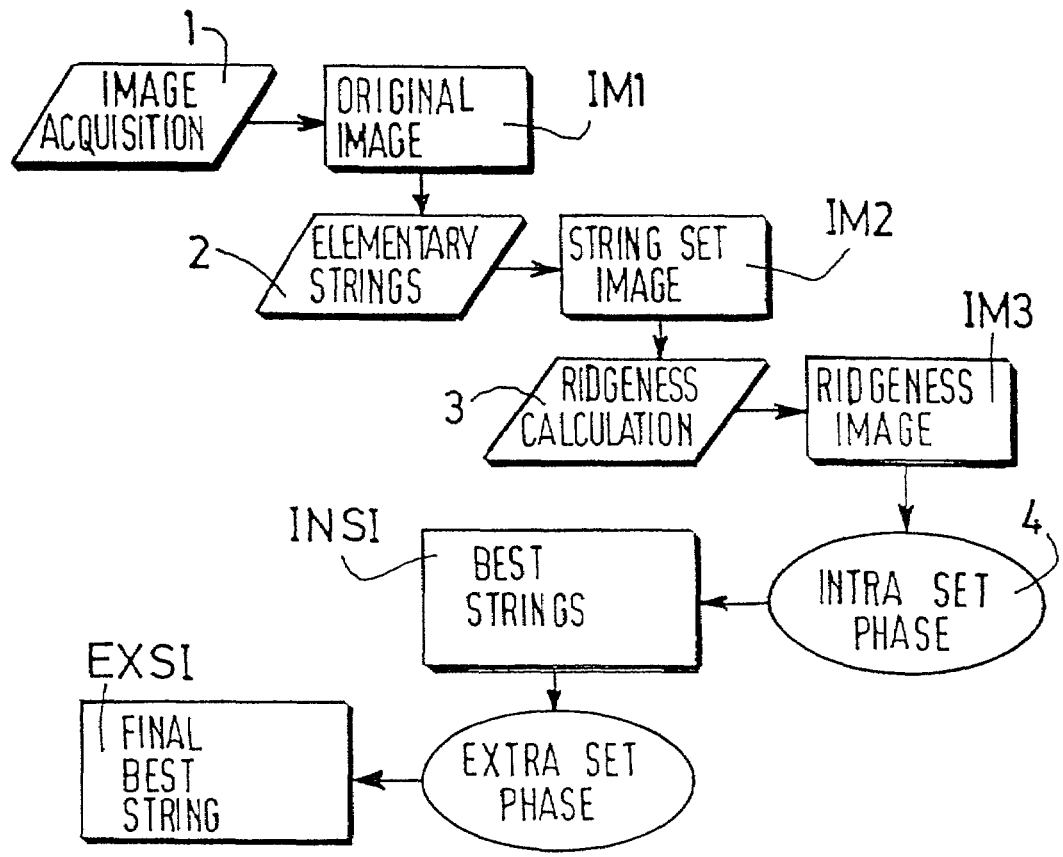
FIG. 1A is a functional block diagram of the main steps of the method.

FIG. 1A shows diagrammatically the main steps of a processing method for extracting a threadlike structure represented on the background of a noisy digital image called original image IM1. The following process is completely described by its functioning on only one image. However, the processing method is appropriate to be carried out in real time, that is to say at a frame rate of about 16 to 25 images per second, if the processing means used for its implementation is appropriate.

Step 1: Image Acquisition

Figure 2A:
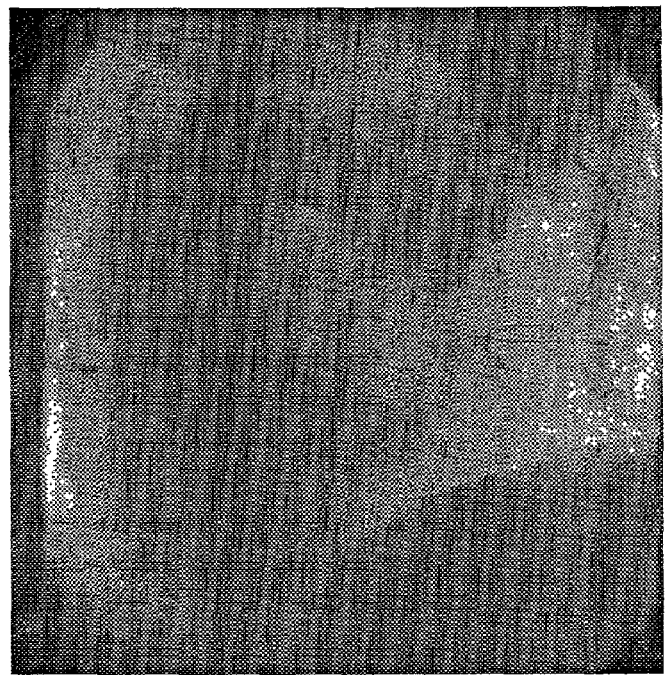
FIG. 2A is an original image representing a guide-wire on a background.

FIG. 2A shows a digital photo called original image IM1, representing a threadlike structure in black on a noisy dark background. Referring to FIG. 1A, in a first step of the method, the image data of said original image are acquired. These data contain intensity and co-ordinate information associated to the image pixels.

Step 2: Preliminary Extraction of Elementary Strings.

The image IM1 comprises different structures such as ridges, or instead troughs, and textures. A positive image is considered as a 3-D picture, having two dimensions for the co-ordinates of pixels and a third dimension for the intensity signals associated to said pixels. A ridge is a crest-like structure formed by adjacent pixels having intensity signals that are maximum in a neighborhood, said pixels having specific dispositions the ones with respect to the others resulting in specific gradient values with respect to orientations. A ridge pixel shows a low intensity gradient in a first determined direction in its neighborhood, and shows an intensity gradient that is maximum in a direction perpendicular to said first direction. The more a given structure is formed of pixels verifying this gradient property, the more the ridgeness measure of the structure is high. Instead of ridges, troughs can be considered in a negative original image IM1 for instance obtained by x-ray imaging. In an x-ray negative image, a guide-wire is a dark structure on a lighter background. In this case, the calculations for extracting the guide-wire have for an object to extract trough pixels, which can be determined by measures similar to ridgeness calculations. In ridgeness calculations applied to troughs determination, the estimation of specific intensity gradients that is required for characterizing ridges is still valuable for characterizing troughs. So, in the description of the present method, these calculations are called "ridgeness" calculations, whether they are applied to ridges or troughs in the original image IM1.

Figure 2B:
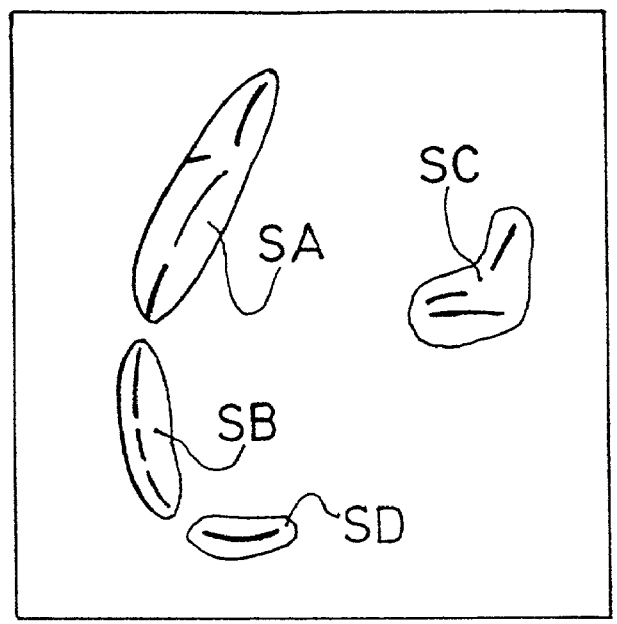
FIG. 2B illustrates the detection of elementary strings of pixels in the image of FIG. 2A.
Figure 2C:
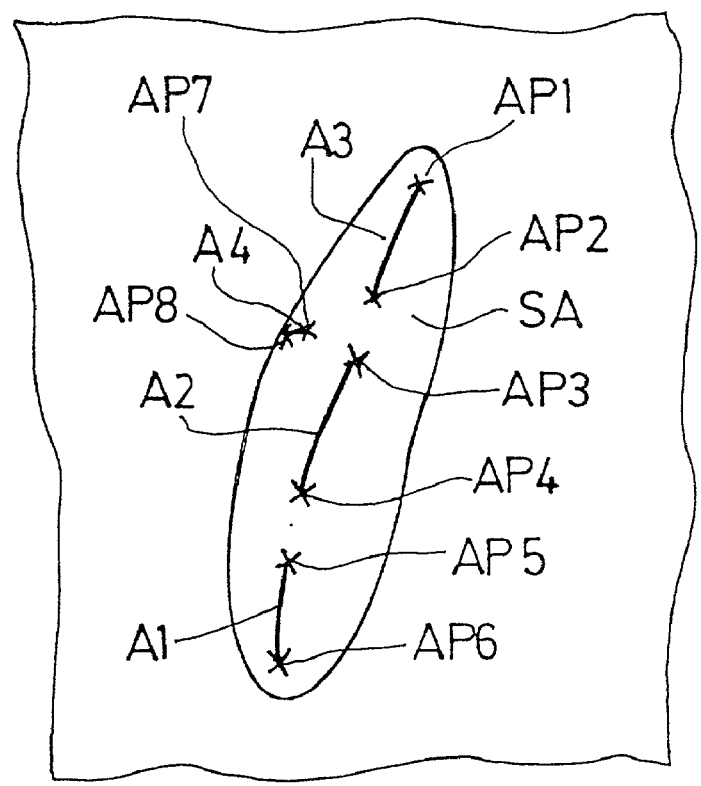
FIG. 2C is an enlarged part of FIG. 2B.

Referring to FIG. 2B, in said preliminary extraction step 2, without prior information other than the image data of IM1, a technique, which is based on the operation of ridge-filters for detecting ridge pixels and on a connectivity analysis for connecting the detected ridge pixels, produces elementary strings of pixels, which are associated to form string sets, such as string sets SA, SB and SC. Within a string set, all the elementary strings are assumed to belong to the same threadlike structure. For instance, as shown in FIG. 2C, which is an enlarged part of FIG. 2B, in string set SA, elementary strings A1, A2, A3, A4 are assumed to belong to the same threadlike structure. The resulting image is called string set image IM2. At the end of this step 2, actually, the threadlike structure is not yet perfectly extracted. The image IM2 shows the five following defects:

1) Within a string set, for example string set SA, some of the elementary strings do not belong to the threadlike structure. So, probably, the elementary string A4 does not actually belong to the threadlike structure of SA.
2) Within a string set, all the elementary strings do not continuously cover the threadlike structure. Hole artifacts are seen for example in string set SA, between the elementary strings A1, A2, between the elementary strings A2, A3, between the elementary strings A4 and other elementary strings.
3) Elementary strings belonging to different string sets might belong to the same threadlike structure. For example, the elementary strings present in string sets SA and SB might belong to the same threadlike structure.
4) In the case when string sets SA and SB belong to the same threadlike structure, then, linking parts of strings are missing between them.
5) Some string sets may not belong to the actual threadlike structure and should be eliminated. This might be the case of string set SC.

So, the present method of image processing has further steps to improve the image of FIG. 2B and correct the above-cited defects.

Step 3: Ridgeness Calculation:

Referring to FIG. 1A, the method comprises a step 3 of "ridgeness" calculation applied to the string set image IM2. This "ridgeness" calculation is performed by applying on the pixels of the image of FIG. 2B, filters known as ridge-filters, which determine the pixels of the ridge structures, or of the troughs, according to the case of positive or negative processed image. Based on this ridgeness calculation, each pixel of the string set image IM2 is further associated to a ridgeness data. The resulting image is called ridgeness image IM3.

Step 4: First Phase=Intra-set Phase

Figure 1B:
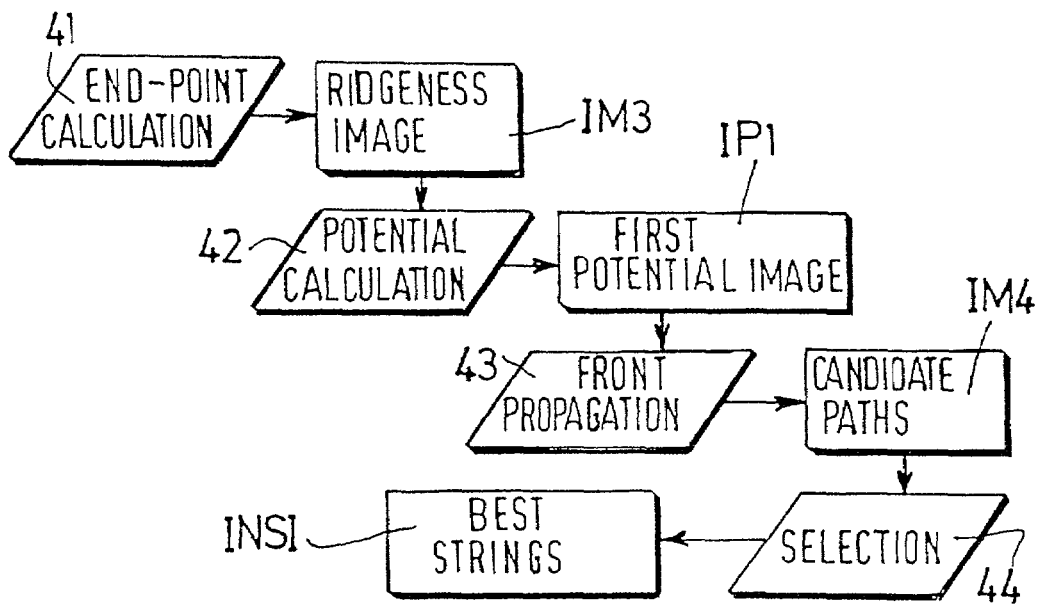
FIG. 1B and FIG. 1C are functional block diagrams of particular steps of the method.

Referring to FIG. 1A and to FIG. 1B, which is a block diagram of step 4, the method specifically comprises a First Phase called "Intra-Set Phase", which is applied to the image IM3 of set of elementary strings where the pixels data (co-ordinates and intensities) are associated to the ridgeness data, and which has for an object to provide one only Best String per string set by correcting the above-described defects 1 and 2 that are respectively: spurious elementary strings inside a given string set and hole artifacts inside said given string set. These defects can be found in each set of strings. The spurious elementary strings and the holes must be automatically eliminated inside each string set. In said Intra-Set Phase, each string set is considered separately. For instance, the string set SA of FIG. 2B is first considered. This string set SA includes elementary strings A1, A2, A3, A4. This Intra-Set Phase comprises several sub-steps:

Referring to FIG. 1B, in a first sub-step 41 of the Intra-Set Phase, the End-Points of each elementary string are calculated from the image data of string set SA and denoted AP1, AP2, AP3, AP4, AP5, AP6, AP7, AP8. The elementary strings are set of pixels connected to one or to two neighbors. On a given elementary string, for example A1, there are only two pixels that have only one neighbor: the pixels AP1, AP2, which are the End-Points of the elementary string A1.

In a second sub-step 42 of the Intra-Set Phase, a First Image of Potentials called IP1 is calculated where: the potentials of the pixels belonging to the considered string set, for example string set SA, are set to first values, favorable to a further operation of Front Propagation, lower than a predetermined potential value, the potentials of pixels of the other string sets, in that case, string sets SB, and SC, are set to second values, unfavorable to said Front Propagation, higher than the given predetermined value, and the pixels located outside the string sets are attributed potentials whose values are function of their ridgeness data values. The more important the ridgeness, the lower the attributed potentials. In a third sub-step 43 of the Intra-Set Phase, a Front Propagation operation is performed to supply Candidate Paths, using a Front Propagation technique, which forms paths only with pixels that have low Potential values. The Front Propagation technique is performed between all the couples of End-Points that are possibly found in the considered string set, for example string set SA, one End-Point being considered a starting pixel and the other End-Point being considered the last pixel of the constructed path. So, several paths, referred to as set of Candidate Paths, are formed from the image of potentials IP1. In the set of Candidate Paths, forming a Candidate Paths image IM4, the number of Candidate Paths is equal to the number of couples of End-Points in the considered string set.

As an example, a front propagation technique is disclosed in a publication entitled "A fast marching level set method for monotonically advancing fronts" by J. A. SETHIAN in Proc. Nat. Acad. Sci., USA, Vol. 93, pp. 1591–1595, February 1996, Applied Mathematics. According to said reference, a front, formed in a 2-D grid of potential values, is propagated using a "Fast Marching Technique" with a determination of the front points. The front is a solution of a so-called Eikonal Equation. The Fast Marching Technique introduces order in the selection of the grid points and sweeps the front ahead in one pass on the 2-D image. The Fast Marching Technique comprises marching the Front outwards by freezing already visited points denoted Alive, coming from a set of points referred to as Narrow Band, and by bringing new ones denoted Far Away into said Narrow Band. The Narrow Band grid points are always up-dated as those having minimal potential values in a neighboring structure denoted Min-Heap and the potential of the neighbors are further re-adjusted. Said Fast Marching technique provides one path of minimal cost joining the start point to respectively each point of the front, said front propagating until the end point is reached. Then, the minimal path is provided by back-propagating from the end point to the start point by the steepest gradient descent in the convex surface. The numerous paths constructed by propagating the front forwards and joining the start point to the different points of the front for forming the convex surface are no more taken into account. Even the path joining the start point to the end point, in the operation of forwarding the front, is not the steepest gradient descent in the back-propagation operation. It is interesting to note that the points of a path constructed in the operation of marching the front forwards are points which have the smallest possible potentials. Starting at the start point, and going forwards from one point to the next point must be at the "minimal cost". So, such a path is a path of "minimal Action", i. e. a path on which the "Sum" or the "Integral" of potentials calculated over point potentials is the smallest though strictly continuously growing as a function of the number of points present on said path between the start point and the current point on the front. This technique needs one Starting End-Point and one Final End-Point to propagate the Front.

In a sub-step 44 of the Intra-Set Phase, one only Path is selected among the set of Candidate Paths as the Best Path for forming one only Best String per string set and for representing the threadlike structure in the considered string set. This step is preferably performed by using a criterion based on the cumulated ridgeness values calculated along the Candidate Paths and by selecting the Best Path for which the cumulated ridgeness value is the highest.

Figure 3E:
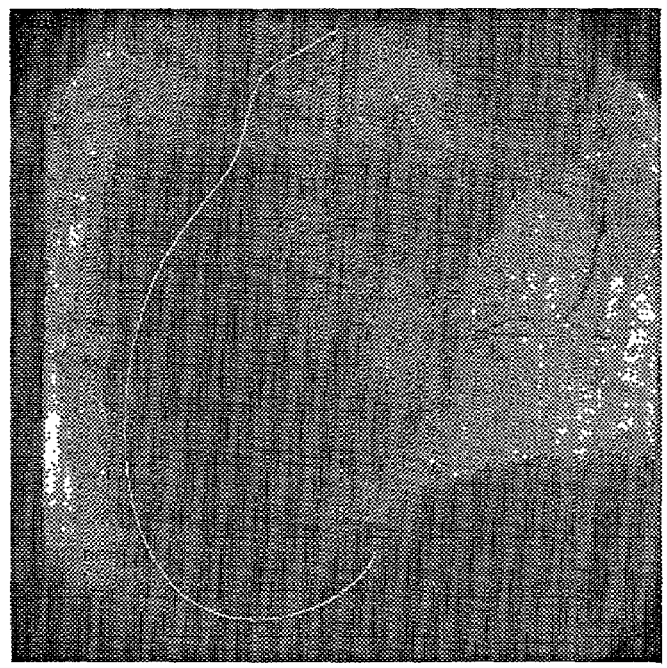
FIG. 3E is a final image.
Figure 3A:
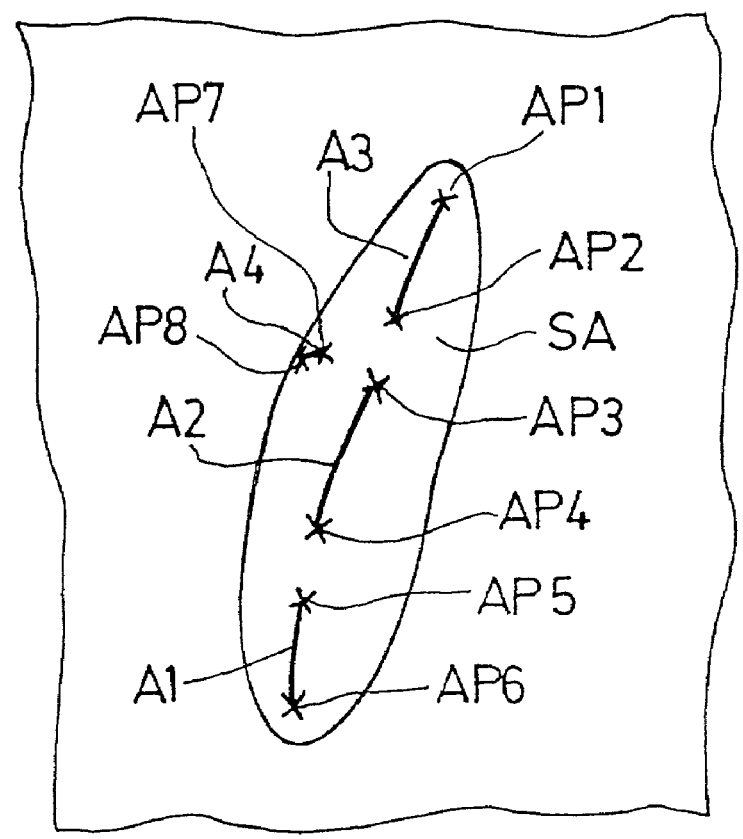
FIG. 3A illustrates the output of the Intra-set Phase of the method.

By the above-described technique of selection of the Best Path among a set of Candidate Paths, small paths are eliminated and the path along which the answer of ridgeness is the highest is selected as Best Path. This step of Best path selection is illustrated by FIG. 3A, where, in string set SA, only one Best String denoted A is selected and the other Candidate Paths are eliminated.

In the Intra-Set Phase, the sub-steps one to four are applied to all string sets present in IP1. The resulting image is called Intra-Set image INSI. If, for instance, only one String Set has been found, then the Best String may constitute the Final Threadlike Structure.

Step 5: Second Phase=Extra-set Phase

Figure 1C:
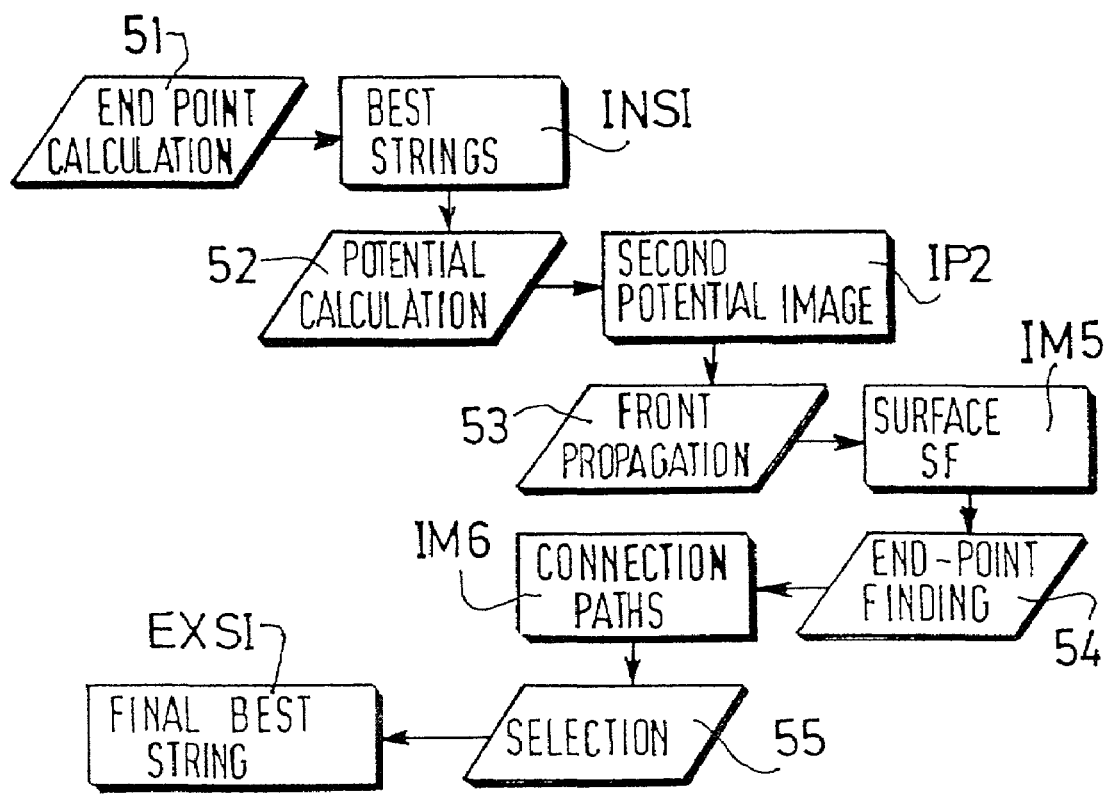

Referring to FIG. 1A and to FIG. 1C, which is a block diagram of step 5, the method specifically comprises a Second Phase called "Extra-Set Phase", which is applied to the image INSI of the Best Strings in the case of several String Sets, and which has for an object to provide one only Final Best String from said Best Strings by correcting the above-cited defects 3 to 5 respectively: holes between two Best Strings belonging to the same threadlike structure and Best Strings that eventually do not belong to said threadlike structure. For example, as shown on FIG. 3B, three Best Strings A, B, C have been obtained from the Intra-Set Phase and they are not linked. Also, the Best String C seems far from the other Best Strings. The holes must be automatically filled between Best String belonging to the same threadlike structure and the spurious Best Strings must be automatically eliminated outside the previously defined string sets. Only one Final Best String GW must be formed from said three Best Strings in a resulting image called Extra-Set image EXSI, for representing the threadlike structure.

Referring to FIG. 1C, in a first sub-step 51 of the Extra-Set Phase, the data relating to these Best Strings A, B, C and the location of their End-Points denoted AP1, AP6 for A and BP1, BP2 for B, are issued from the Best String image INSI in order to be processed.

In a second sub-step 52 of the Extra-Set Phase, a second Image of Potentials, called IP2, is calculated from the Intra-Set image INSI, where: all the string pixels are attributed high potentials, and the other points generate a lower potential with respect to a given predetermined potential value. The purpose of this Extra-Set Phase is no longer to perform a Front Propagation along the already estimated Best Strings; instead a Front Propagation is required between the End-Points of the Best Strings in order to connect said Best Strings. It is the reason why the string pixels are attributed high potentials.

Figure 3B:
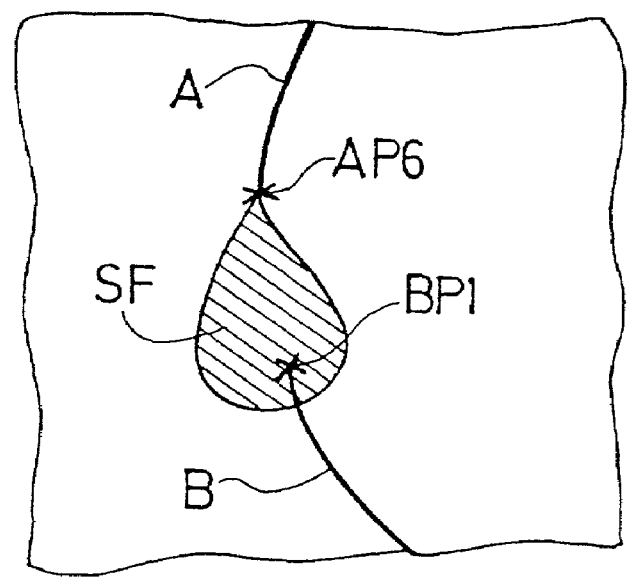
FIG. 3B illustrates the operation of the Extra-Set Phase.

Referring to FIG. 3B, which shows an enlarged part of FIG. 3A, in a third sub-step 53 of the Extra-Set Phase, a Front Propagation operation is performed on the points external to the Best Strings in the second image of potentials IP2. This Front Propagation operation comprises a predetermined number of iterations, which operation covers a surface denoted SF, which is delimited by the front of the propagation and which comprises pixels of the second Image of Potentials IP2. This Front Propagation starts at one End-Point of one first Best String, for example AP6 of Best String A, and propagates in the continuation of Best String A, opposite to said Best String A. Said surface SF is defined by a parameter of the Front Propagation, which is predetermined for assuring that the Best Strings linked by this operation belong to the same threadlike structure, thus forming an image IM5.

In a fourth sub-step 54, said surface SF is examined in the image IM5, in order to determined whether End-Points relating to other Best Strings are found inside the surface. There may be one or several End-Points besides the starting End-Point, found in said surface. For instance, the End-Point BP1 is found as illustrated by FIG. 3B. The Front Propagation operation produces respective Connection Paths linking the starting End-Points to the found End-Points, in an image IM6.

Figure 3C:
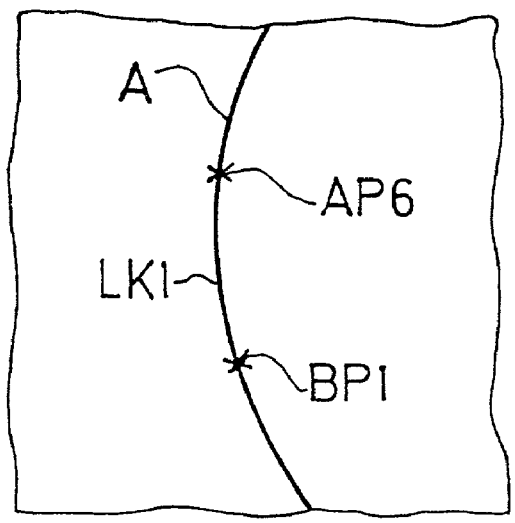
FIG. 3C illustrates results of said Extra-Set Phase
Figure 3D:
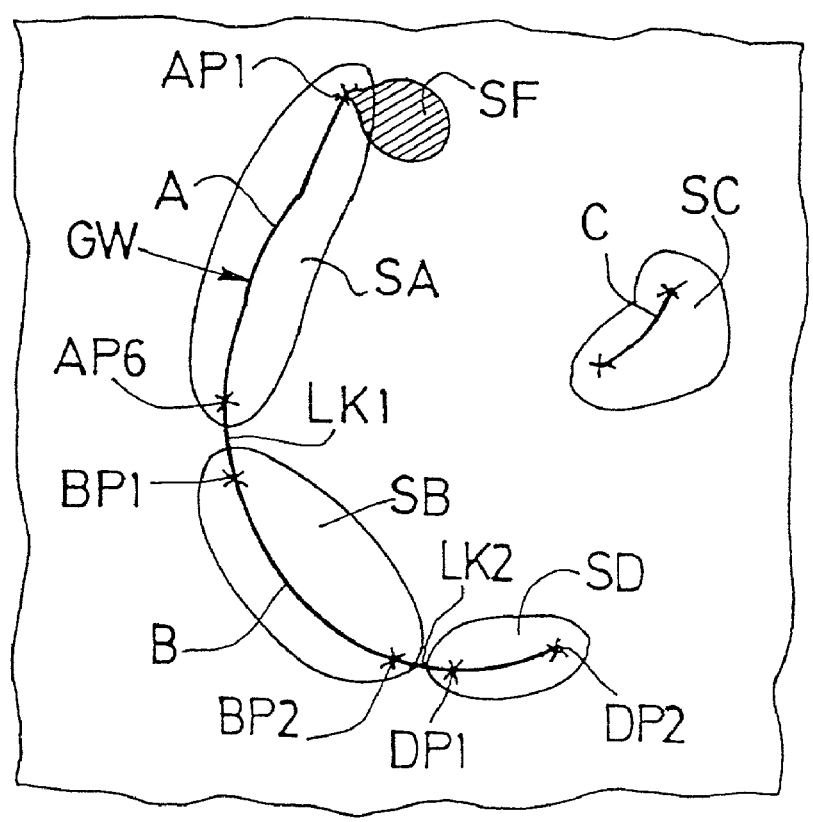
FIG. 3D illustrates elimination of spurious string parts using said Extra-Set Phase.

In a fifth sub-step 55 of the Extra-Set Phase, a Best Connection Path LK among these several respective Connection Paths is selected using a criterion preferably based on the ridgness data as illustrated by FIG. 3C. For instance, the Best Connection Path LKI links the End-Point AP6 of A to the End-Point BP1 of B.

Referring to FIG. 3C, the third sub-step 53, the fourth sub-step 54 and the fifth sub-step 55 of the Extra-Set Phase are performed between all the Best Strings previously determined in the second Potential image IP2, by taking the still free End-Points as starting End-Points until all the Best Strings that may possibly be connected using the above-described Extra-Set Phase are linked. As the surface SF determined by the Front Propagation operation is limited, some Best Strings might be too far from given starting End-Points to be reached by said surface SF. So, when there are Best Strings still isolated at the end of the Extra-Set Phase, they are eliminated. By using the Extra-Set Phase, more than one Final Best String FBS may be produced. If so, again a ridgeness criterion taking into account shape parameters such as length and intensity parameters are used to select the Final Best String to represent the threadlike structure GW. The experience shows that usually only one string, which is substantially longer and more contrasted than other structures, is found at the end of the Extra-Set Phase and that the last selection operation is easy to perform without ambiguity for providing GW in EXSI. FIG. 3E is a digital photo showing the extracted guide-wire in white instead of black for contrast and visibility.

It is important to note that, depending on the original image, on the one hand, the First Phase called Intra-Set Phase is able to provide directly the whole and complete threadlike structure when uniquely applied to the elementary strings forming one set of pixel strings : the resulting Best String is the extracted threadlike structure. And, on the other hand, the Second Phase, called Extra-Set Phase is able to provide directly the whole and complete threadlike structure when uniquely applied to the elementary strings, each elementary string being in this case directly considered as a Best String and processed as such to provide the Final Best String for forming the extracted threadlike structure.

Figure 4A:
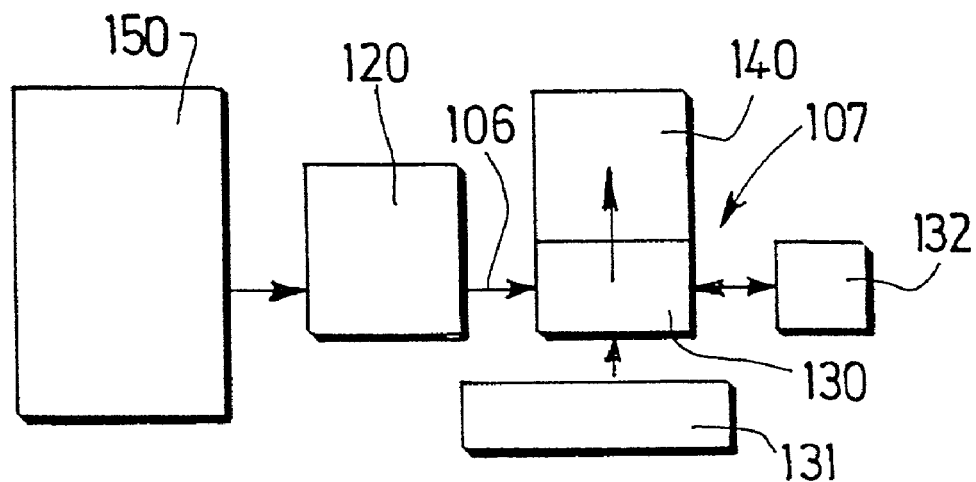
FIG. 4A and FIG. 4B illustrate a system and an examination apparatus.
Figure 4B:
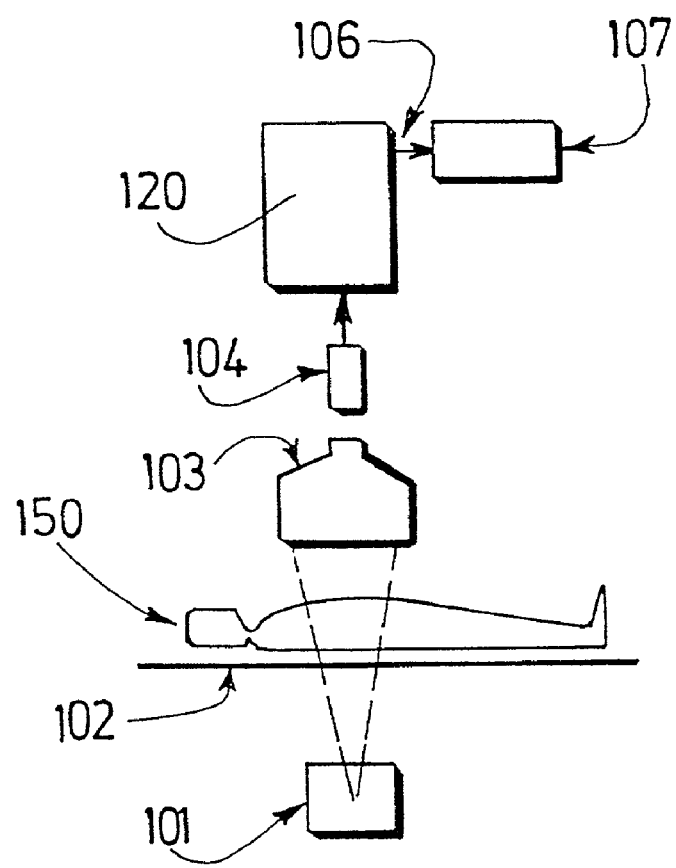

Referring to FIG. 4A, 4B, an X-ray medical examination apparatus 150 comprises means for acquiring digital image data of a medical image, and a digital processing system 120 for processing these data according to the processing method described above. The X-ray apparatus comprises an X-ray source 101, a table 102 for receiving a patient to be examined, an optical system 103, 104 for providing image data to the processing system 120 which has at least one output 106 to provide image data to display and/or storage means 107. The display and storage means may respectively be the screen 140 and the memory of a workstation 130. The display means may comprise a screen to display the medical original images and the processed medical images, in such a way that the displayed processed images may help the practitioner during a medical act. Said storing means may be alternately external storing means.

The image processing system 120 may be: a suitably programmed computer of the workstation 130, or a special purpose processor having circuit means such as LUTs, Memories, Filters, Logic Operators, that are arranged to perform the functions of the method steps according to the invention. The workstation 130 may also comprise a keyboard 131 and a mouse 132.

What is claimed is:

1. An image processing method for extracting a threadlike structure represented within a digital noisy original image, comprising steps of:
   acquiring the original image data;
   extracting pixel strings of a threadlike structure within the original image data; and
   conducting a Phase operation in order to automatically generate one Best String from the pixel strings for representing the threadlike structure, wherein the Phase operation is based on detecting a relative intensity of pixels in a neighborhood of pixels in the digital noisy original image.

2. An image processing method as set forth in claim 1, wherein the step of conducting a Phase operation includes the steps of:
   first forming a String Set with the pixel strings;
   second forming a set of Candidate Paths linking couples of End-Points of the pixel strings within said string set; and
   selecting one Best Candidate Path as the Best String within the String Set.

3. An image processing method as set forth in claim 2, wherein the step of conducting a Phase operation further includes steps of:
   generating a set of Candidate Paths from which the best string is selected by implementing a Front Propagation operation upon the couples of End-Points of the pixel strings inside the said String Set.

4. An image processing method as set forth in claim 1, wherein the step of conducting a Phase operation includes sets of:
   determining adjacent couples of pixel strings having opposite End-points,
   forming sets of Connection Paths outside the pixel strings, linking the opposite End Points of said adjacent couples,
   selecting respective Best Connection Paths for linking the couples of pixel string; and
   forming one Best String from the linked pixel strings.

5. An image processing method as set forth in claim 4, wherein the step of conducting a Phase operation further includes steps of:
   generating sets of connection paths using a Front Propagation operation, which front propagation operation operates upon the couples of opposite End-Points of the pixel strings, outside the pixel strings, and
   utilizing the sets of Connection Paths to select the Best Connection Paths.

6. An image processing method as set forth in claim 1, further comprising steps of:
   extracting elementary pixel strings in string sets deriving from the same threadlike structure;
   conducting a First Phase operation which automatically generates one Best String per string set, wherein said Best String represents the threadlike structure.

7. An image processing method as set forth in claim 6, further comprising the step of:
   conducting a Second Phase operation by linking Best Strings to automatically generate one Final Best String, which final best string represents the threadlike structure.

8. An image processing method as set forth in claim 6, wherein the step of conducting the First Phase operation includes the steps of:
   first forming, inside a considered string set, couples of End-Points of elementary strings,
   second forming set of Candidate Paths linking said couples of End-Points, and
   selecting one Best Candidate Path as the Best String.

9. An image processing method as set forth in claim 8, wherein the step of conducting the First Phase operation further includes the step of:
   conducting a Front Propagation operation between the couples of End-Points of the elementary strings inside a considered String Set in order to generate a set of Candidate Paths from which the Best String is selected.

10. An image processing method as set forth claimed in claim 7, wherein the step of conducting the Second Phase operation further includes the steps of:
    first forming couples of Best Strings outside each string set by using couples of opposite End-Points of said couples,
    second forming sets of Connection Paths linking said opposite End Points, and
    selecting one Best Connection Path for linking each couple of Best Strings and one Final Best String among the Best Strings connected by the Connection Paths.

11. An image processing method as set forth in claim 10, wherein the step of conducting the Second Phase includes the further steps of:
    conducting a Front Propagation operation between said opposite couples of End-Points of the Best Strings outside the String Sets in order to generate the sets of Connection Paths, from which the Best Connection Paths are selected.

12. An image processing method as set forth in claim 6, wherein the step of conducting a first phase operation includes that, prior to the implementing the first phase operation, a step of calculating a ridgeness calculation to form a ridgeness data image including ridge pixels showing an intensity gradient that is maximum in a first determined direction in its neighborhood, and showing a lower intensity gradient in a direction perpendicular to said first direction, such that the greater the number of pixels that verify the gradient property are found in the formed image structure, the higher the ridgeness measure of the image structure.

13. An image processing method as set forth in claim 12, further comprising the steps of:
    first generating First Potential Image from the ridgeness data image, where the potentials of the pixels derived from the considered string set are set to first values, which first values are lower than a given predetermined value, the potentials of pixels of the other string sets are set to second values, which second values are higher than said predetermined value, and the pixels located outside the string sets are attributed potentials whose values are function of their ridgeness data values, second generating a Front Propagation operation for propagating the lower potentials in the First Potential Image, and forming the Candidate Paths between couples of End-Points of the elementary strings.

14. An image processing method as set forth in claim 6, further comprising steps of:

determining the opposite End-Points of couples of Best Strings, forming a Second Potential Image from the Best String image, wherein all the string pixels are attributed potentials, which are higher than a given predetermined potential value, and the other pixels are attributed potentials, which are lower than the given predetermined potential value, conducting a Front Propagation operation for propagating the lower potentials in the Second Potential Image, and forming the Connection Paths between couples of opposite End-Points of the couples of Best Strings.

15. An image processing method as set forth in claim 6, wherein the phase operation is conducted in accordance with the height of ridgeness of the structures of the Paths.

16. A system comprising a suitably programmed computer or a special purpose processor having circuit means, which circuit means are arranged to process image data according to the method set forth in claim 1.

17. An examination apparatus comprising:

means for acquiring medical digital image data, and a system having access to said medical digital image data for carrying out a processing method as set forth in claim 1, and display means for displaying the medical digital images and the processed medical digital images.

18. A computer-readable medium comprising a set of instructions, for performing the steps set forth in claim 1.

* * * * *